June 14, 1966  R. D. LAMBERT  3,255,478
POWER-OPERATED LOADING RAMP
Filed Nov. 14, 1962  5 Sheets-Sheet 1
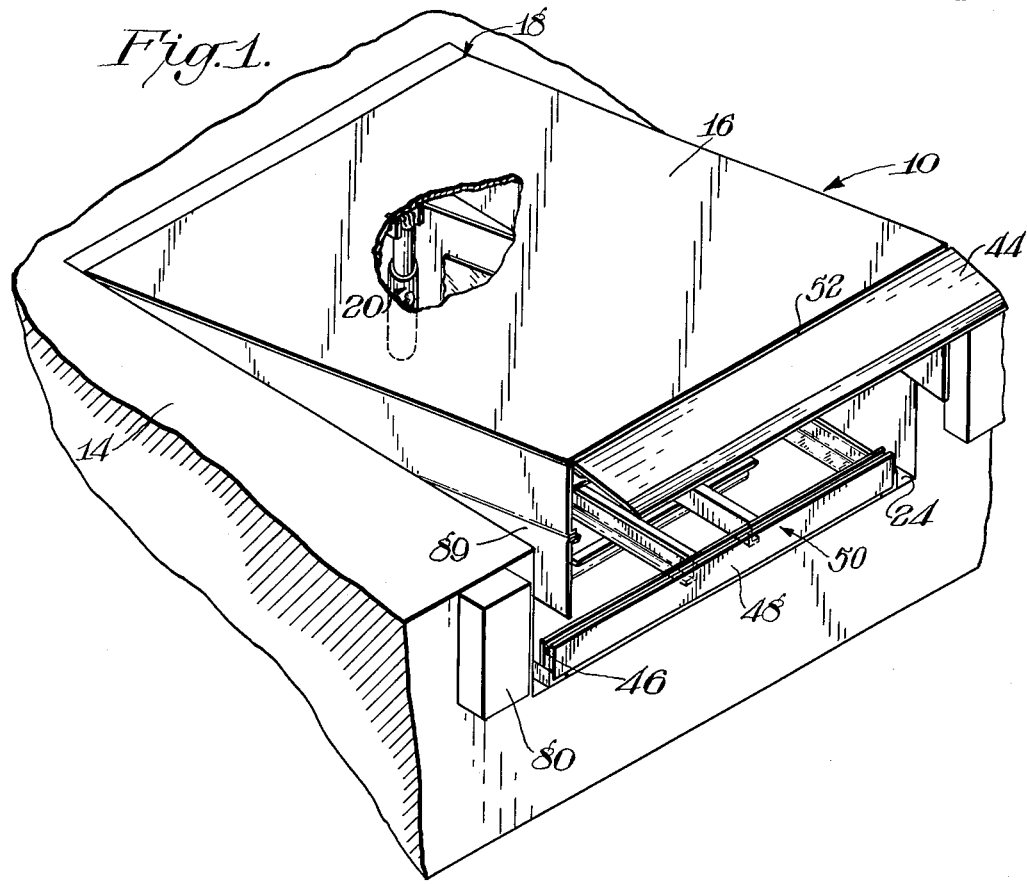
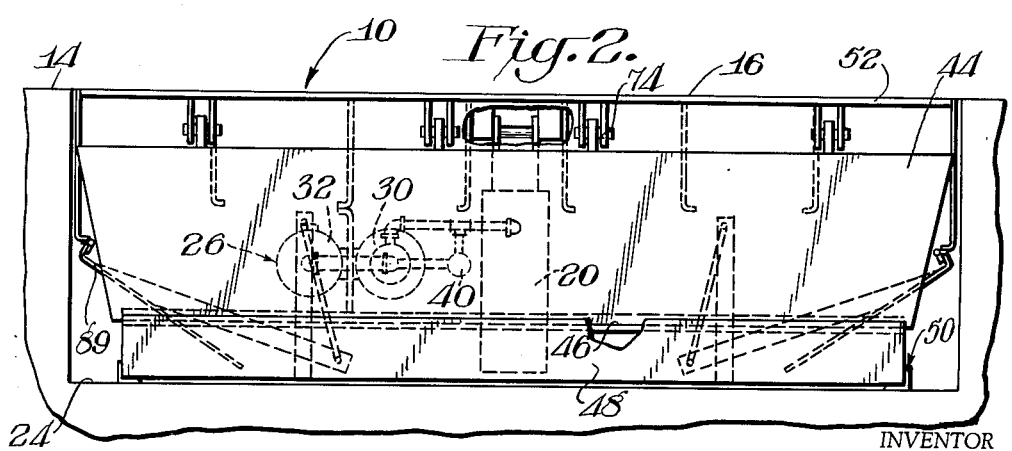
INVENTOR
Robert D. Lambert
BY Connolly and Hutz
ATTORNEYS

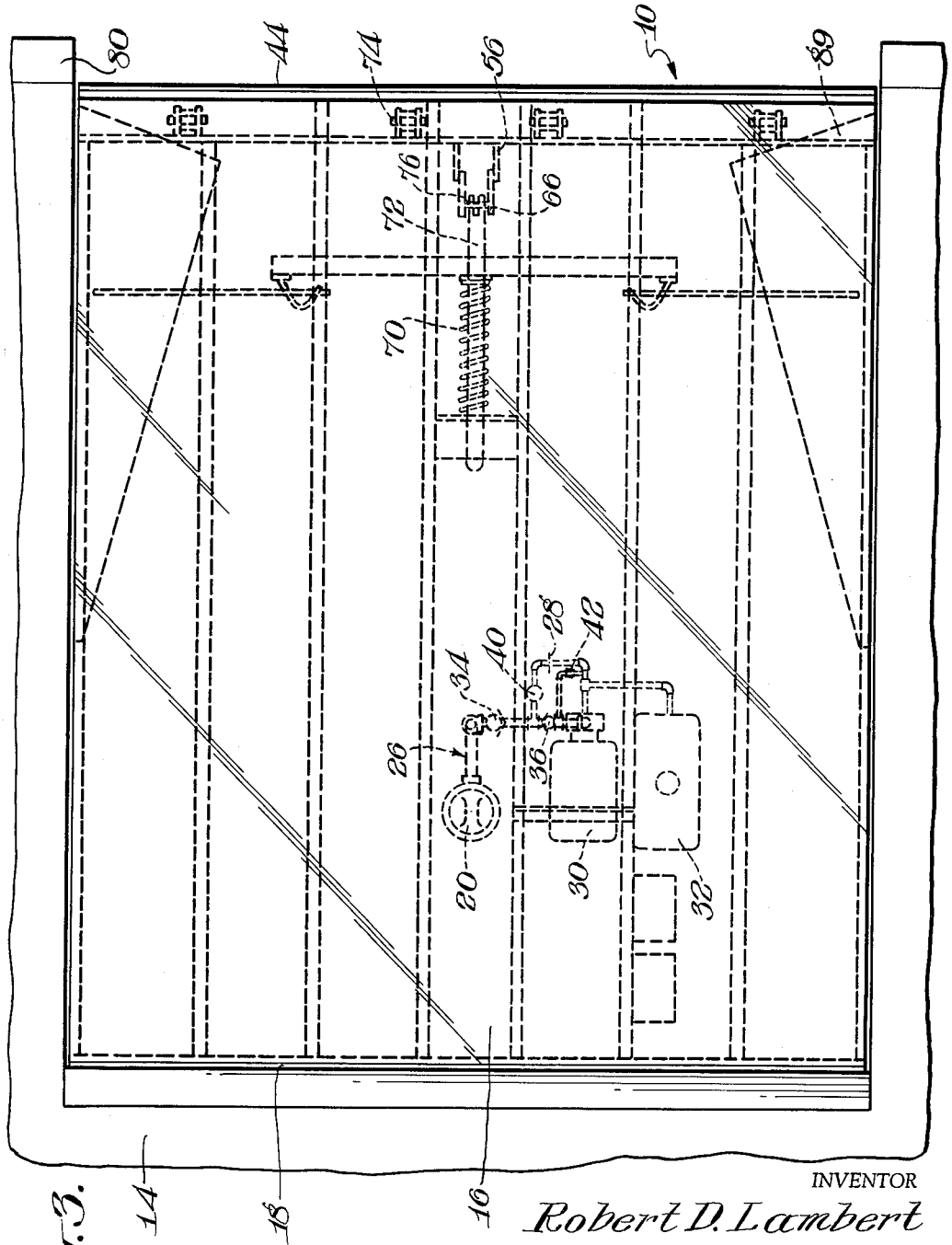

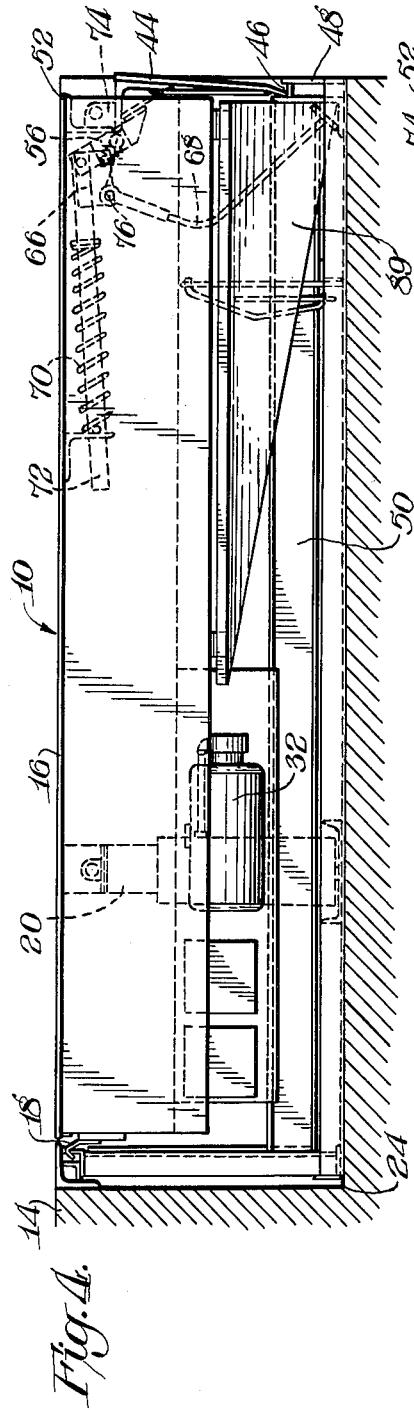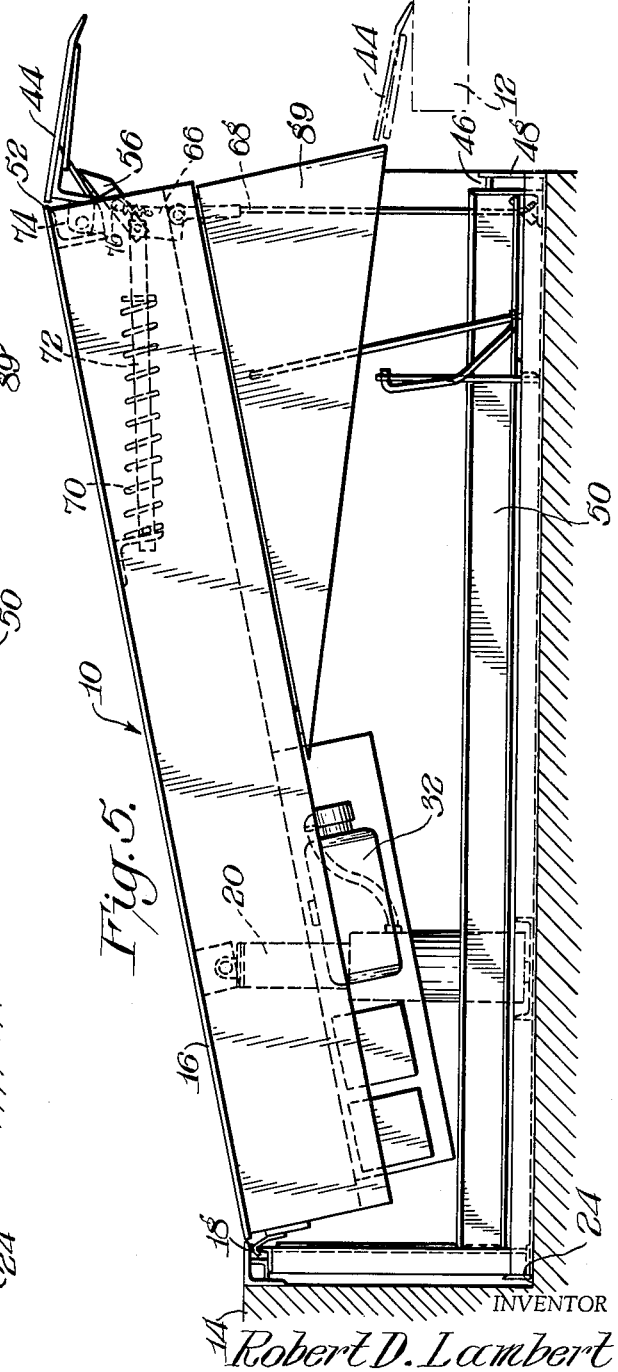

INVENTOR
Robert D. Lambert
BY Connolly and Hutz
ATTORNEYS

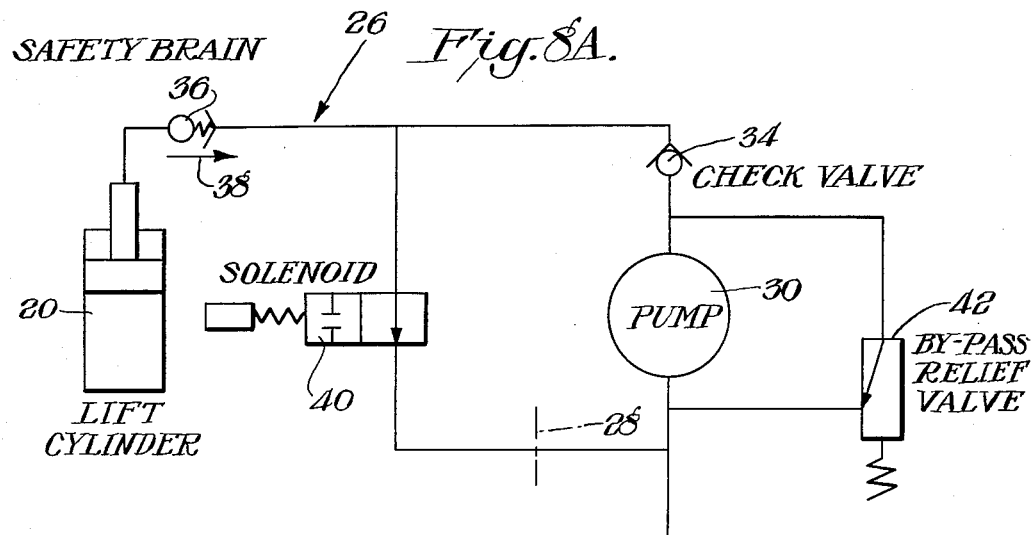
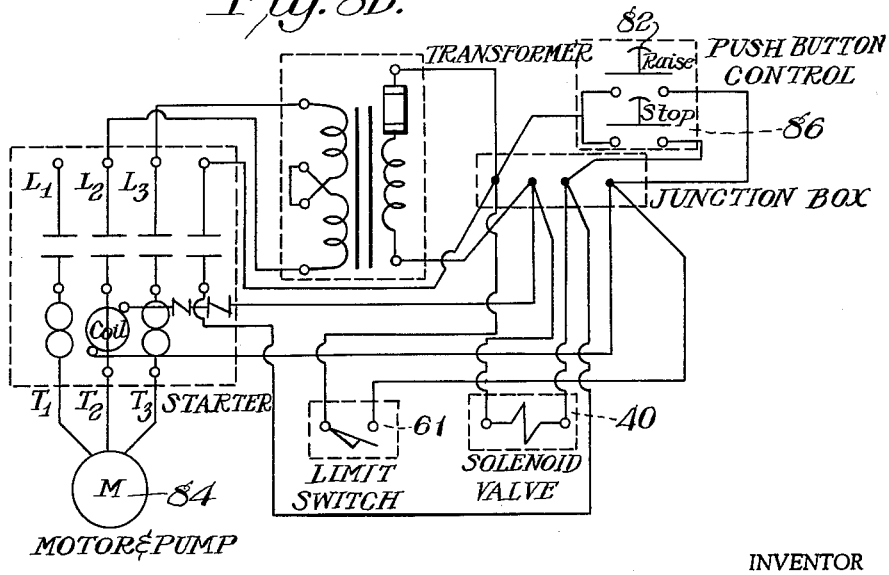

United States Patent Office 3,255,478
Patented June 14, 1966

3,255,478
POWER-OPERATED LOADING RAMP
Robert D. Lambert, Fort Wayne, Ind., assignor to Symington Wayne Corporation, Salisbury, Md., a corporation of Maryland
Filed Nov. 14, 1962, Ser. No. 237,691
16 Claims. (Cl. 14—71)

This invention relates to a power-operated ramp for bridging the space beween a loading dock and a truck parked next to it, and it more particularly relates to such a ramp in which power is only used while elevating it.

Various arrangements have been used for power operating a ramp which bridges the space between a loading dock and the varying level bed of a truck parked next to it. When such power-operated systems operate continuously to control the position of the ramp, they are subject to undue wear and complication.

An object of this invention is to provide an automatic power-operated ramp in which the cycle of operation of the power system is minimized.

Another object is to provide such a ramp which is elevated by hydraulic means.

In accordance with this invention a powered elevating means is used to raise the platform to an upwardly inclined position above the bed of a vehicle, and it is then inactivated to lower the platform and cause to freely rest upon the vehicle bed. A retarding means reacts between the platform and the dock to prevent the platform from dropping too fast when the power system is inactivated. This permits the power elevating system to be used only for raising the platform above a vehicle bed so that it can then be dropped down upon it. Thereafter it freely rests upon the vehicle bed and automatically conforms to its varying level. When the vehicle drives away, the unsupported ramp slowly lowers with its retarding means preventing it from dropping too fast and sustaining any damage. While the ramp is being raised to the elevated position in readiness for dropping upon a vehicle bed, the retarding means may be disengaged to prevent it from interfering with the raising of the ramp. The powerelevating means may be a hydraulic system in which a restricting orifice provides a retarding effect when the platform drops.

Novel features and advantages of the present invention will become apparent to one skilled in the art from a reading of the following description in conjunction with the accompanying drawings wherein similar reference characters refer to similar parts and in which:

FIG. 1 is a three-dimensional view of a ramp which is a hydraulic embodiment of this invention;

FIGS. 2, 3 and 4 are respectively front elevational, top plan, and side elevational views of the ramp of FIG. 1 in a lowered condition;

FIG. 5 is a side elevational view of the ramp of FIG. 1 in a raised condiiton;

Figure 6:
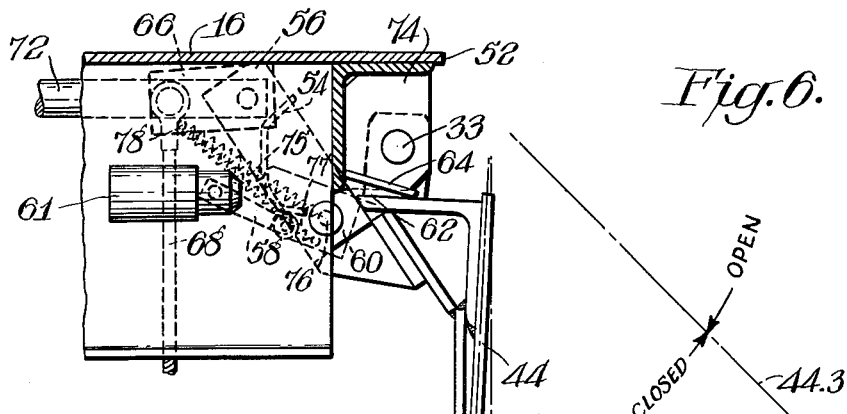
FIGS. 6–8 are side elevational views partially in cross section of the front portion of the ramp shown in FIG. 1 with the movable lip in various phases of operation.

FIGS. 8A and B are respectively schematic diagrams of the hydraulic and electrical systems associated with the ramp.

In FIGS. 1–8 is shown a power-operated ramp 10 for bridging the space between a vehicle bed 12, shown in FIG. 5, and a loading dock 14 comprising a platform 16 connected to loading dock 14 by a hinge 18. A powerelevating means 20 comprising a hydraulic piston and cylinder assembly reacts between the bottom of pit 24 in loading dock 14 and platform 16 to rotate it upwardly about hinge 18. A control means 26 shown in FIGS. 2–5 comprising a hydraulic pumping system activates cylinder and piston assembly 20 to raise platform 16 to the upwardly inclined position shown in FIG. 5 above the bed of a vehicle 12 parked next to loading dock 14. The platform is dropped from there onto vehicle bed 12 and thence freely rests upon the vehicle bed as its height varies during the loading operation. A retarding means comprising orifice 28 shown in FIG. 3 is incorporated in hydraulic control system 26 for preventing platform 16 from dropping too fast and damaging itself both when dropping into engagement with the bed 12 of a truck or when it is left unsupported when the truck is driven away.

Figure 7:
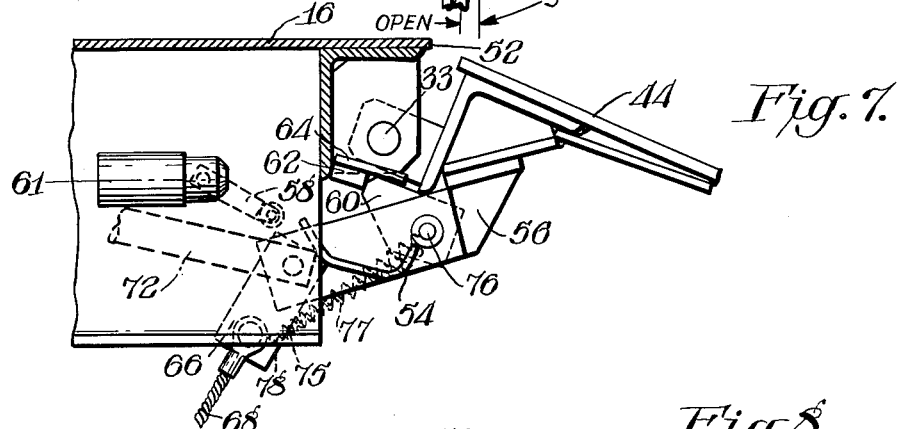
Figure 8:
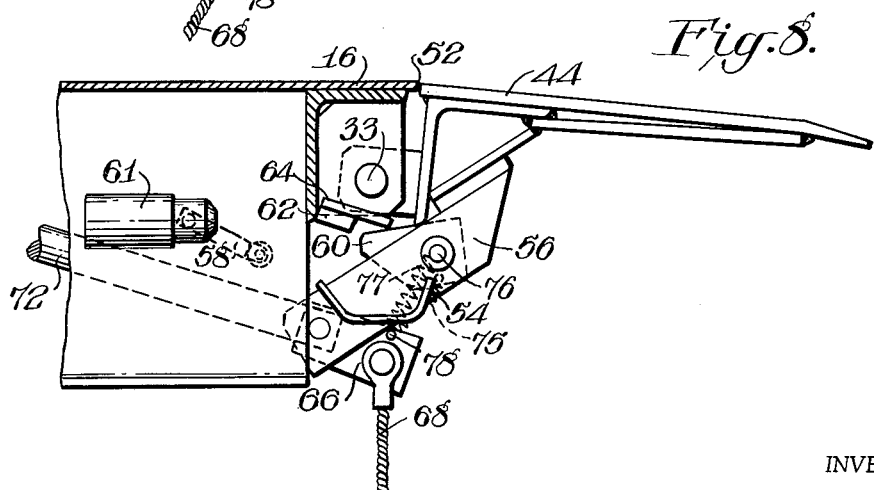

As shown in FIGS. 3 and 8A hydraulic system 26 includes a pump 30 which draws its suction from a sump or reservoir 32 and discharges through a check valve 34 and excess velocity shut-off valve 36 to cylinder and piston assembly 20. Valve 36 may be described as an excess velocity fuse, and it automatically shuts itself off when the flow through it in the direction of arrow 38 away from piston and cylinder assembly 20 rises above a predetermined safe maximum rate thereby preventing platform 16 from dropping too fast as later described in detail. Valve 36 is for example of the type described in U.S. Letters Patent 2,821,209. Pump 30 is therefore used to raise cylinder and piston assembly 20, and the ramp 10 automatically drops when the pump is inoperative. The bleeding of pressure from cylinder and piston assembly 20 is accomplished through solenoid valve 40, which together with pump 30 are operated by the electrical control system of FIG. 8B later described in detail. A bypass relief valve 42 bypasses pump pressure back to suction when the operation of pump 30 is continued by manual actuation after the ramp has been raised to its maximum height. As shown in FIGS. 1 and 6–8, a movable lip 44 is mounted at the front end of platform 16 for engaging the bed 12 of a truck as shown in FIG. 5.

As shown in FIGS. 6–8, lip 44 has three main positions. In FIG. 6 lip 44 hangs substantially vertically downward in the crossover position, which is also illustrated in FIG. 4. In this crossover position the bottom of lip 44 rests within crossover slot 46 in beam 48 connected across the front of frame 50 mounted within pit 24.

In FIGS. 5 and 8 lip 44 is shown in the substantially horizontal working position in which it is actually inclined approximately 6° downwardly to provide a smooth transition between the surface of platform 16 and the bed 12 of a truck. In this working position lip 44 is engaged with the front edge 52 of platform 16 and thereby prevented from rising any further upwardly with respect to platform 16. Ramp 10 can thus follow the upward and downward movement of the truck by resting freely upon it with the elevating system maintained substantially inactive because solenoid valve 40 is opened and pump 30 is stopped. This is accomplished as shown in FIG. 8 by the disengagement of cam surface 54 from actuating arm 58 of control switch 61 mounted under platform 16. Cam 54 is attached to actuating arm 56 welded to the bottom of lip 44.

When switch 61 is unactuated as shown in FIG. 8, pump 30 is stopped and solenoid valve 40 is opened which allows oil to bleed from piston and cylinder assembly 20 back into sump 32 through orifice 28. Were it not for the fact that in FIG. 8 lip 44 rests upon bed 12 of a truck, ramp 10 would slowly lower as oil bleeds from piston 20 backwardly through open solenoid valve 40 and orifice 28 into sump or reservoir 32. The fall of platform 16 is accordingly retarded by orifice 28. The position of cam 54 shown in FIG. 6 also allows switch 61 to open when lip 44 is in the crossover position shown in solid outline. However when lip 44 rises slightly from the crossover position designated by centerline 44.1, cam 54 rotates into actuating contact with arm 58 of switch 61 and maintains it closed from an inclination at a slight angle above the crossover position designated by centerline 44.2, for example as little as 3°, to an angle of approximately 45° from vertical designated by centerline 44.3 in FIG. 6. When lip 44 rises above this arbitrary half-way raised position designated 44.3, cam 54 moves out of actuating relationship with switch 61, and thereafter pump 30 remains stopped and solenoid valve 40 is opened causing pressure to bleed from solenoid and piston assembly 20. The operation of lip 44 accordingly automatically controls the raising action of power elevating means 20 in a manner later described in detail.

In FIG. 7 is shown the ready position of lip 44 in which it is raised to within aproximately 20° of the horizontal, and in this position arresting lug 60 rotatably connected to lip actuating arm 56 moves into engagement with arresting bar 62, which together with its support bar 64 are welded across the front underside of platform 16. Engagement of arresting lug 60 is assisted by the downward pull on lip actuating arm 56 of cable link 66, which is rotatably connected to the end thereof. Link 66 is pulled downwardly by the taut pulling of cable 68 anchored to the bottom of frame 50 when ramp 10 is elevated to the position shown in FIGS. 5 and 7. The upward rotation of lip 44 to the ready position is facilitated by the reaction of compression spring 70 mounted about bar 72 between platform 16 and bar 72 in a direction to rotate lip 44 and actuating arm 56 upwardly about its hinge 74. Spring 70 accordingly helps counterbalance the weight of lip 44, facilitates its upward movement and checks its downard swing.

A pair of tension springs 75 and 77 are anchored to cable link 66. As shown in FIGS. 6-8, spring 77 connected between pin 76 on arm 56 and pin 78 on link 66 reacts between them to urge link 66 toward arm 56. Spring 75 reacts between pin 78 on cable link 66 and arresting lug 60 to cause the nose of lug 60 to rotate upwardly into contact with arresting bar 62, as shown in FIG. 7. This maintains lip 44 held in the ready condition shown in FIG. 7 approximately 20° below horizontal until it drops onto a truck bed 12 as shown in broken outline in FIG. 5. Lip 44 is then rotated upwardly which relieves the spring tension of spring 75 on arresting lug 60.

The complete sequence of release of lip 44 from the ready condition shown in FIG. 7 is accomplished in the following manner. FIG. 7 corresponds to the condition shown in FIG. 5 when ramp 10 is fully raised with cable 68 pulled taut. When ramp 10 starts to drop, the tension of cable 68 is relieved which allows spring 77 to pull cable link 66 toward arresting lug 60. This releases the tension on spring 75 thereby allowing lip 44 to be maintained in the ready condition only through the contact of the nose of arresting lug 60 with arresting bar 62. When lip 44 contacts the truck bed 12, the movement of latching lug 60 together with actuating arm 56 away from bar 62 allows gravity to rotate lug 60 downwardly thereby causing it to drop free of contact with arresting bar 62. This allows lip 44 to freely drop downwardly thereafter toward the substantially vertical crossover position shown in FIGS. 4 and 6 when truck bed 12, shown in FIG. 5, drives away from under it at which time ramp 10 itself also drops downwardly. As previously described, hydraulic pump 30 is stopped and solenoid valve 40 is open which allows ramp 10 to lower while retarded by orifice 28 in the hydraulic system. However if there is any appreciable weight on ramp 10 when it is suddenly left unsupported and it should drop too fast, safety excess velocity valve 36 actuated by the flow of hydraulic fluid at too fast a rate suddenly closes thereby holding the ramp motionless should it drop at an unsafe rate of speed. Valve 36 can be reset and opened after the excess load is removed from ramp 10.

The front of ramp 10 is protected by two rubber faced bumpers 80 on the front of loading dock 12. Ramp 10 is for example six feet wide by eight feet long, including a fourteen inch one-piece lip, which is substantially flexible to permit it to compensate for out-of-level truck beds without tilting platform 16. It carries 20,000 pounds of crossover traffic and travels approximately 29 inches above dock level and eleven inches below dock level. When a truck is backed into position against bumpers 80 while ramp 10 is in the crossover position shown in FIG. 4, raise button 82 shown in FIG. 8B is actuated to activate pump motor 84 and close solenoid valve 40. Platform 16 rotates upwardly; and before it reaches its maximum height, the lip operating linkage previously described causes lip 44 to rise to its ready position shown in FIG. 7. Switch 82 bypasses the limit switch 61; and should the operator continue to hold raise button 82 after ramp 10 is fully elevated, pump 30 bypasses through relief valve 42. When raise button 82 is released, solenoid valve 40 opens and platform 16 lowers slowly by gravity through the bleeding of piston and cylinder assembly 20, which is retarded by flow-restricting orifice 28 to lower ramp 10 with lip 44 contacting truck bed 12 as shown in FIG. 5. The operator may halt the lowering motion of the platform at any time by pressing stop button 86. During the loading or unloading operation, ramp 10 freely follows the movement of truck bed 12; and no load whatsoever is placed upon the power-elevating system therby minimizing power requirements and wear and strain upon it. When the loading or unloading operation is completed and truck bed 12 moves away from under ramp 10, it repositions itself as described in the following.

When ramp 10 is left unsupported while above dock level, lip 44 drops to the crossover position; and it lowers by gravity to dock level to engage the lower edge of dropped lip 44 into crossover slot 46 to support rated capacity cross traffic.

When ramp 10 is left unsupported by truck bed 12 when it is below dock level, lip 44 drops. As lip 44 moves toward the crossover position and falls between positions 44.3 and 44.2 shown in FIG. 6, limit switch 61 is closed by actuation of cam 54 to close solenoid valve 40 and start pump 30 thereby raising ramp 10 above dock level. When the lip 44 falls into the crossover position, pump 30 automatically stops; and solenoid valve 40 opens to cause ramp 10 to lower by gravity to the cross traffic position. The counterbalancing of lip 44 provides a sufficient extent of pump operation and solenoid valve closure during downward movement of lip 44 to raise ramp 10 from any lowered position sufficiently high to engage lip 44 in crossover slot 46.

If a truck pulls out from under ramp 10 when an appreciable load remains upon it, the excess velocity valve 36 slams it shut to hold ramp 10 in position until the load is backed off and valve 36 reset. Thereafter ramp 10 then lowers slowly to the crossover position in the manner previously described.

As shown in FIG. 1 skirts 89 hinged to the sides of ramp 10 shown in the stored position in FIG. 2, close the sides of the ramp and prevent access beneath it when it is in the raised position shown in FIGS. 1 and 5.

What is claimed is:

1. A power-operated ramp for bridging the space between a vehicle bed and a loading dock comprising a platform, hinge means connecting the rear of said platform to the edge of said loading dock, powered elevating means reacting between said loading dock and said platform for rotating it upwardly about said hinge means, a control means connected to said powered elevating means for operating it to raise said platform to an upwardly inclined position above the bed of a vehicle and for lowering said platform to rest upon said bed, a lip disposed upon the front of said platform, hinge means connecting said lip to rotate upon the front of said platform from a substantially vertical crossover position to a bridging position in which it forms a substantial continuation of said platform, said control means including lip position detecting means connected to said control means for actuating said control means, said lip position detecting means having means connected to said lip for actuating said control means to cause said powered elevating means to raise said platform when said lip is within a predetermined operating angle extending upwardly from a lower position slightly raised above said crossover position whereby said ramp is automatically elevated high enough to allow said lip to drop into said substantially vertical crossover position.

2. A ramp as set forth in claim 1 wherein the upper limit of said predetermined operating angle is disposed below said bridging position of said lip to thereby avoid operation of said powered elevating means when said lip is in said bridging position.

3. A ramp as set forth in claim 2 wherein said lip position detecting means comprises a switch mounted upon the front of said platform adjacent said lip, and cam and follower means connect said lip to operate said switch.

4. A ramp as set forth in claim 1 wherein said powered elevating means is a fluid operated means, said fluid operated means includes pressure source means and a pressure release means and said control means being arranged to inactivate said pressure source means and to activate said pressure release means to cause said platform to lower under the influence of gravity and freely rest upon said bed.

5. A ramp as set forth in claim 4 wherein said pressure release means includes a flow restricting orifice that retards the speed of lowering of said platform.

6. A ramp as set forth in claim 4 wherein said pressure release means includes a drain valve which is connected to be opened by said control means to cause said platform to lower.

7. A ramp as set forth in claim 6 wherein said fluid operated means includes a piston and cylinder assembly, an electric motor driven pump, said drain valve comprises a solenoid valve, a check valve, a reservoir, a piping system connecting the aforementioned parts of said fluid operated means to each other, said pump being connected to said piston and cylinder assembly through said check valve, said piston and cylinder assembly being connected to said reservoir through said solenoid valve, and said control means including a manually operated switch which when actuated maintains said motor running and said solenoid valve closed to raise said platform and when unactuated stops said ramp and opens said solenoid valve to connect said piston and cylinder assembly to said reservoir to lower said platform.

8. A ramp as set forth in claim 7 wherein said fluid operated means includes a flow restricting orifice that retards the speed of lowering of said platform.

9. A ramp as set forth in claim 7 wherein an upper restraining means is associated with said platform for preventing it from rising above a predetermined upper limit of travel, and a bypass relief means is connected between said pump and said reservoir for relieving excess pressure when said pump is operated at said upper limit of travel.

10. A ramp as set forth in claim 9 wherein said lip position detecting means is a sensing switch in said control means that is connected to operate said motor and to close said solenoid valve when it is actuated.

11. A ramp as set forth in claim 1 wherein a crossover slot is provided in a frame for said ramp upon said loading dock under the substantially vertical crossover position of said lip, and a ridge extends in front of said crossover slot for holding said lip within said operating angle when it is disposed in front of said crossover slot whereby said ramp is automatically raised for lowering under gravity to said crossover position whenever the bottom of said lip is disposed below said crossover slot when it hangs freely downward.

12. A ramp as set forth in claim 4 wherein an excess velocity shut off valve is incorporated in said hydraulic cylinder and piston system for automatically stopping it and maintaining said ramp motionless should its downward movement occur at too fast a rate as a result of a load remaining upon said ramp when it is left unsupported.

13. A ramp as set forth in claim 5 wherein a manually operated switch operates said fluid operated powered elevating means to elevate said ramp, a stop means preventing operation of said ramp beyond a predetermined upward angle of inclination, a bypass in the system of said fluid operated means to prevent said system from building up excess pressure when said ramp is raised against said stop means, and said control means causing said fluid operating means to bleed pressure through said orifice and slowly drop said ramp when said manually operated switch is released.

14. A power-operated ramp for bridging the space between a vehicle bed and a loading dock comprising a platform, hinge means connecting the rear of said platform to the edge of said loading dock, powered elevating means reacting between said loading dock and said platform for rotating it upwardly about said hinge means, a control means connected to said powered elevating means for activating it to raise said platform to an upwardly inclined position above the bed of a vehicle and for inactivating it to cause said platform to lower under the influence of gravity and freely rest upon said bed, and a retarding means reacting between said platform and said loading dock for preventing said platform from dropping too fast when its outer end is unsupported, said hinge means comprising a substantially horizontal bar having a knife edge upon its upper surface connected to said platform, an inverted hinge angle connected to said loading dock, said knife-edged bar being inserted within said inverted hinge angle, an upper hinge plate secured to the rear of said platform and disposed above said inverted hinge angle, said power elevating means reacting against said platform to maintain said knife edge engaged within said inverted hinge angle whereby the load on said platform is primarily absorbed by said power elevating means, and the upper portion of said inverted angle receiving the load of said platform through said upper hinge plate only when it exceeds a predetermined maximum load.

15. A ramp as set forth in claim 14 wherein said inverted channel is mounted upon a series of spaced vertically disposed bars connected to said loading dock whereby any debris falling into the space between said loading dock and the rear edge of said platform is allowed to drop past said hinge means to make said hinge self-cleaning.

16. A power-operated ramp for bridging the space between a vehicle bed and a loading dock comprising a platform, hinge means connecting the rear of said platform to the edge of said loading dock for rotation from raised to lowered positions through a substantially horizontal crossover position, powered elevating means reacting between said loading dock and said platform for rotating it upwardly about said hinge means, control means including manually operable means connected to said powered elevating means for operating it to raise said platform to an upwardly inclined position above the bed of the vehicle and for lowering said platform to rest upon said bed, a lip disposed upon the front of said platform, hinge means connecting said lip to rotate upon the front of said platform from a substantially vertical crossover position to a bridging position in which it forms a substantial continuation of said platform, said control means including automatically operable means for raising said platform when said ramp is in a predetermined lowered position below said substantially horizontal crossover position, and said automatically operable means including lip position detecting means having means connected to said lip for inactivating said powered elevating means when said lip drops into said substantially vertical crossover position to thereafter cause said platform to drop into said substantially horizontal crossover position.

References Cited by the Examiner

UNITED STATES PATENTS

| | | | |
|---|---|---|---|
| 2,585,695 | 2/1952 | Snow | 14—71 |
| 2,644,971 | 7/1953 | Rowe | 14—71 |
| 2,714,735 | 8/1955 | Watson | 14—71 |
| 2,846,703 | 8/1958 | Adley | 14—71 |
| 2,881,457 | 4/1959 | Rodgers | 14—71 |
| 3,117,332 | 1/1964 | Kelley | 14—71 |
| 3,170,179 | 2/1965 | Layne | 14—71 |
| 3,175,238 | 3/1965 | Pennington | 14—71 |

CHARLES E. O'CONNELL, *Primary Examiner.*

JACOB L. NACKENOFF, *Examiner.*

N. C. BYERS, *Assistant Examiner.*